United States Patent
Cholli et al.

(10) Patent No.: US 7,754,267 B2
(45) Date of Patent: *Jul. 13, 2010

(54) POLYMERIC ANTIOXIDANTS

(75) Inventors: Ashok L. Cholli, Chelmsford, MA (US);
Vijayendra Kumar, Lowell, MA (US);
Javant Kumar, Westford, MA (US);
Virinder Singh Parmar, Lowell, MA (US); Lynne Ann Samuelson,
Marlborough, MA (US); Ferdinando F. Bruno, Andover, MA (US)

(73) Assignees: The United States of America as represented by the Secretary of the Army, Washington, DC (US);
University of Massachusetts Lowell, Lowell, MA (US)

( * ) Notice: Subject to any disclaimer, the term of this patent is extended or adjusted under 35 U.S.C. 154(b) by 90 days.

This patent is subject to a terminal disclaimer.

(21) Appl. No.: 11/711,395

(22) Filed: Feb. 27, 2007

(65) Prior Publication Data

US 2007/0154430 A1 Jul. 5, 2007

Related U.S. Application Data

(63) Continuation of application No. 10/408,679, filed on Apr. 4, 2003, now Pat. No. 7,223,432.

(60) Provisional application No. 60/370,468, filed on Apr. 5, 2002.

(51) Int. Cl.
*A23D 7/00* (2006.01)
*C09K 15/04* (2006.01)

(52) U.S. Cl. .................. 426/541; 426/544; 426/546; 252/399; 252/407

(58) Field of Classification Search ................ 426/541, 426/544, 546; 252/399, 407
See application file for complete search history.

(56) References Cited

U.S. PATENT DOCUMENTS

| | | |
|---|---|---|
| 3,294,836 A | 12/1966 | Peterson et al. |
| 3,441,545 A | 4/1969 | Blatz et al. |
| 3,459,704 A | 8/1969 | Peterson et al. |
| 3,632,785 A | 1/1972 | Bornstein |
| 3,645,970 A | 2/1972 | Kleiner |
| 3,655,831 A | 4/1972 | Friedman |
| 3,996,160 A | 12/1976 | Dale et al. |
| 3,996,198 A | 12/1976 | Wang et al. |
| 4,094,857 A | 6/1978 | Wolfe, Jr. |
| 4,098,829 A | 7/1978 | Weinshenker et al. |
| 4,202,816 A | 5/1980 | Moser et al. |
| 4,205,151 A | 5/1980 | Dale et al. |
| 4,213,892 A | 7/1980 | Scott |
| 4,219,453 A | 8/1980 | Sakurai et al. |
| 4,267,358 A | 5/1981 | Hechenbleikner et al. |
| 4,281,192 A | 7/1981 | Jacquet et al. |
| 4,283,572 A | 8/1981 | Klicker |

(Continued)

FOREIGN PATENT DOCUMENTS

CS 111291 6/1964

(Continued)

OTHER PUBLICATIONS

Dordick, J.S., et al., "Polymerization of Phenols Catalyzed by Peroxidase in Nonaqueous Media," *Biotechnology and Bioengineering*, XXX:31-36 (1987).

(Continued)

*Primary Examiner*—Leslie Wong
(74) *Attorney, Agent, or Firm*—Hamilton, Brook, Smith & Reynolds, P.C.

(57) ABSTRACT

Antioxidant polymers of the present invention comprise repeat units that include one or both of Structural Formulas (I) and (II):

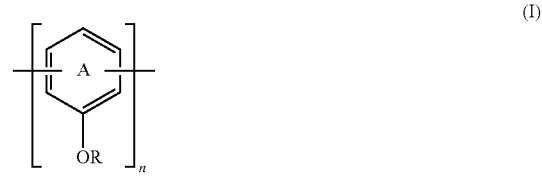

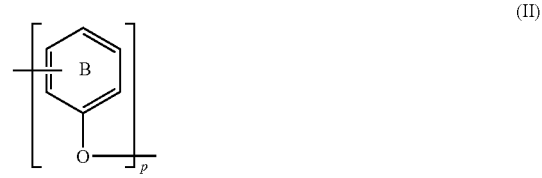

wherein:
R is —H or a substituted or unsubstituted alkyl, acyl or aryl group;
Ring A is substituted with at least one tert-butyl group or substituted or unsubstituted n-alkoxycarbonyl group;
Ring B is substituted with at least one —H and at least one tert-butyl group or substituted or unsubstituted n-alkoxycarbonyl group;
Rings A and B are each optionally substituted with one or more groups selected from the group consisting of —OH, —NH, —SH, a substituted or unsubstituted alkyl or aryl group, and a substituted or unsubstituted alkoxycarbonyl group;
n is an integer equal to or greater than 2; and
p is an integer equal to or greater than 0.

The invention also includes methods of using and preparing these polymers.

11 Claims, 3 Drawing Sheets

U.S. PATENT DOCUMENTS

| | | | |
|---|---|---|---|
| 4,341,879 A | 7/1982 | Sugio et al. |
| 4,355,148 A | 10/1982 | Layer et al. |
| 4,377,666 A | 3/1983 | Farrar |
| 4,447,657 A | 5/1984 | Firth et al. |
| 4,465,871 A | 8/1984 | Firth et al. |
| 4,511,491 A | 4/1985 | Ishii et al. |
| 4,849,503 A | 7/1989 | Cotter et al. |
| 4,855,345 A | 8/1989 | Rosenberger et al. |
| 4,857,596 A | 8/1989 | MacLeay et al. |
| 4,900,671 A | 2/1990 | Pokora et al. |
| 4,968,759 A | 11/1990 | Kikuchi et al. |
| 4,977,004 A | 12/1990 | Bettle, III et al. |
| 5,013,470 A | 5/1991 | Benfaremo |
| 5,017,727 A | 5/1991 | Olivier |
| 5,143,828 A | 9/1992 | Akkara et al. |
| 5,206,303 A | 4/1993 | Tse et al. |
| 5,207,939 A | 5/1993 | Farng et al. |
| 5,320,889 A | 6/1994 | Bettle, III |
| 5,449,715 A | 9/1995 | Plochocka et al. |
| 5,574,118 A | 11/1996 | Olivier |
| 5,834,544 A | 11/1998 | Lin et al. |
| 5,911,937 A | 6/1999 | Hekal |
| 5,994,498 A | 11/1999 | Tripathy et al. |
| 6,018,018 A | 1/2000 | Samuelson et al. |
| 6,150,491 A | 11/2000 | Akkara |
| 6,342,549 B1 | 1/2002 | Hirose et al. |
| 6,444,450 B2 | 9/2002 | Akkara et al. |
| 6,770,785 B1 | 8/2004 | Desai et al. |
| 6,828,364 B2 | 12/2004 | Gugumus |
| 7,223,432 B2 | 5/2007 | Cholli et al. |
| 2001/0041203 A1 | 11/2001 | Uno et al. |
| 2002/0128493 A1 | 9/2002 | Romanczyk, Jr. et al. |
| 2002/0183470 A1 | 12/2002 | Tripathy et al. |
| 2003/0030033 A1 | 2/2003 | Duyck et al. |
| 2003/0191242 A1 | 10/2003 | Zedda et al. |
| 2004/0164279 A1 | 8/2004 | Stevenson et al. |
| 2004/0186167 A1 | 9/2004 | Dou et al. |
| 2004/0214935 A1 | 10/2004 | Cholli et al. |
| 2005/0238789 A1 | 10/2005 | Cholli et al. |
| 2006/0029706 A1 | 2/2006 | Cholli et al. |
| 2006/0041087 A1 | 2/2006 | Cholli |
| 2006/0041094 A1 | 2/2006 | Cholli |
| 2006/0128929 A1 | 6/2006 | Yang et al. |
| 2006/0128930 A1 | 6/2006 | Dhawan et al. |
| 2006/0128931 A1 | 6/2006 | Kumar et al. |
| 2006/0128939 A1 | 6/2006 | Kumar et al. |
| 2006/0189824 A1 | 8/2006 | Kumar et al. |
| 2006/0233741 A1 | 10/2006 | Kumar et al. |
| 2007/0106059 A1 | 5/2007 | Cholli et al. |
| 2007/0135539 A1 | 6/2007 | Cholli et al. |
| 2007/0149660 A1 | 6/2007 | Kumar et al. |
| 2007/0154608 A1 | 7/2007 | Cholli et al. |
| 2007/0154720 A1 | 7/2007 | Cholli et al. |
| 2007/0161522 A1 | 7/2007 | Cholli et al. |

FOREIGN PATENT DOCUMENTS

| | | | |
|---|---|---|---|
| DE | 197 47 644 A1 | 5/1999 |
| DE | 19843875 A1 | 3/2000 |
| EP | 0 181 023 A1 | 5/1986 |
| EP | 0 289 077 A2 | 11/1988 |
| EP | 0 404 039 A1 | 12/1990 |
| EP | 0 618 203 A1 | 10/1994 |
| EP | 0 688 805 A1 | 12/1995 |
| EP | 1 067 144 A1 | 1/2001 |
| EP | 1468968 A1 | 10/2004 |
| FR | 2 183 973 | 12/1973 |
| GB | 1 283 103 | 7/1972 |
| GB | 1 320 169 | 6/1973 |
| GB | 1 372 042 | 10/1974 |
| GB | 1 389 442 | 4/1975 |
| GB | 1 469 245 | 4/1977 |
| GB | 1 482 649 | 8/1977 |
| JP | 44024274 | 10/1969 |
| JP | 44028850 | 11/1969 |
| JP | 45 2980 | 1/1970 |
| JP | 49 29339 | 3/1974 |
| JP | 57085366 A | 5/1982 |
| JP | 59025814 | 2/1984 |
| JP | 59197447 | 11/1984 |
| JP | 60-199832 | 10/1985 |
| JP | 05 199858 | 8/1993 |
| JP | 06 247959 | 9/1994 |
| JP | 08027226 A | 1/1996 |
| JP | 09262069 | 10/1997 |
| JP | 09 328519 | 12/1997 |
| JP | 09 328521 | 12/1997 |
| JP | 9322784 A | 12/1997 |
| JP | 11-80063 | 3/1999 |
| JP | 11-158103 | 6/1999 |
| JP | 2003138258 | 5/2003 |
| NL | 7 905 000 | 3/1980 |
| WO | WO 92/20734 | 11/1992 |
| WO | WO 01/18125 A1 | 3/2001 |
| WO | WO 01/48057 A1 | 7/2001 |
| WO | WO 02/079130 A1 | 10/2002 |
| WO | WO 03/087260 A1 | 10/2003 |
| WO | WO 03/102004 A1 | 12/2003 |
| WO | WO 2004/024070 A2 | 3/2004 |
| WO | WO 2004/050795 A2 | 6/2004 |
| WO | WO 2005/025513 A2 | 3/2005 |
| WO | WO 2005/025646 A2 | 3/2005 |
| WO | WO 2005/060500 A2 | 7/2005 |
| WO | WO 2005/070974 A2 | 8/2005 |
| WO | WO 2005/071005 A1 | 8/2005 |
| WO | WO 2006/018403 A1 | 2/2006 |
| WO | WO 2006/060801 A2 | 6/2006 |
| WO | WO 2006/104957 A2 | 10/2006 |

OTHER PUBLICATIONS

Kazandjian, R.Z., et al., "Enzymatic Analyses in Organic Solvents," *Biotechnology and Bioengineering*, XXVIII:417-421 (1986).

Klibanov, A.M., et al., "Enzymatic Removal of Toxic Phenols and Anilines from Waste Waters," *J. of Applied Biochemistry*, 2(5):414-421 (1980).

Ikeda, R., et al., "Novel Synthetic Pathway to a Poly(phenylene oxide). Laccase-Catalyzed Oxidative Polymerization of Syringic Acid," *Macromolecules*, 29:3053-3054 (1996).

Akkara, J.A., et al., "Synthesis and Characterization of Polymers Produced by Horseradish Peroxidase in Dioxane," *J. of Polymer Science: Part A: Polymer Chemistry*, 29(11):1561-1574 (1991).

Ayyagari, M.S., et al., "Controlled Free-Radical Polymerization of Phenol Derivatives by Enzyme-Catalyzed Reactions in Organic Solvents," *Macromolecules*, 28(15):5192-5197 (1995).

Ryu, K., et al., "Peroxidase-Catalyzed Polymerization of Phenols," Biocatalysis in Agricultural Biotechnology, Chapter10:141-157 (1988).

Bruno, F.F., et al., "Enzymatic Template Synthesis of Polyphenol," Materials Research Society Symposium Proceedings vol. 600, Electroactive Polymers (EAP):255-259 (1999).

Akkara, J.A., et al., "Hematin-Catalyzed Polymerization of Phenol Compounds," Macromolecules, 33(7):2377-2382 (2000).

Dordick, J.S., "Enzymatic Catalysis in Monophasic Organic Dolvents," *Enzyme Microb. Technol.*, 11(4):194-211 (1989).

FS&T 821 "Food Lipids," [online], Oct. 2001 [retrieved on Oct. 29, 2002]. Retrieved from the Internet <URL: http://class.fst.ohio-state.edu/fst821/>.

FST 821 "Course Schedule," [online], [retrieved on Oct. 29, 2002]. Retrieved from the Internet <URL: http://class.fst.ohio-state.edu/fst821/>.

FS&T 821 "Antioxidant," [online], [retrieved on Oct. 29, 2002]. Retrieved from the Internet <URL: http://class.fst.ohio-state.edu/fst821/>.

Jialanella, G.and Pilrma, I., "Synthesis of Poly(vinyl alcohol-co-vinyl gallate) by the Chemical Modification of Poly(vinyl alcohol)," Polymer Bulletin 18:385-389 (1987).

Jayaprakasha, G.K., et al., "Antioxidant Activity of Grape Seed (*Vitis vinifera*) Extracts on Peroxidation Models In Vitro," *Food Chemistry*, 73:285-290 (2001).

Hidalgo, M.E., et al., "Antioxidant Activity of Depsides and Depsidones," Phytochemistry, 37(6):1585-1587 (1994).

Khan, K.M., et al., "An Expedient Esterification of Aromatic Carboxylic Acids Using Sodium Bromate and Sodium Hydrogen Sulfite," *Tetrahedron* 59(29):5549-5554 (2003).

March, J., Advanced Organic Chemistry, McGraw Hill Book Company, New York, pp. 251-259 (1977).

Mehdipour-Ataei, S., et al., "Novel Diols Containing Ester and Amide Groups and Resulting Poly(ester amide ester)s," *J. Applied Polymer Sci.*, 93:2699-2703 (2004), XP002420014.

Database Beilstein [online] Beilstein Institut Zur Förderung Der Chemischen Wissenschaften; XP002420027, Beilstein Registry No. 3517906.

Database Beilstein [online] Beilstein Institut Zur Förderung Der Chemischen Wissenschaften; XP002420028, Beilstein Registry No. 5840042.

Database Beilstein [online] Beilstein Institut Zur Förderung Der Chemischen Wissenschaften; XP002420029, Beilstein Registry No. 2311871.

Database Beilstein [online] Beilstein Institut Zur Förderung Der Chemischen Wissenschaften; XP002420030, Beilstein Registry No. 8876646.

Database Beilstein [online] Beilstein Institut Zur Förderung Der Chemischen Wissenschaften; XP002420031, Beilstein Registry No. 2271400.

Database Beilstein [online] Beilstein Institut Zur Förderung Der Chemischen Wissenschaften; XP002420032, Beilstein Registry No. 2212095.

Database Beilstein [online] Beilstein Institut Zur Förderung Der Chemischen Wissenschaften; XP002420033, Beilstein Registry No. 8941955.

Database Beilstein [online] Beilstein Institut Zur Förderung Der Chemischen Wissenschaften; XP002420034, Database Accession No. 2312425.

Database Beilstein [online] Beilstein Institut Zur Förderung Der Chemischen Wissenschaften; XP002420035, Beilstein Registry No. 905950.

Database Beilstein [online] Beilstein Institut Zur Förderung Der Chemischen Wissenschaften; XP002420036, Beilstein Registry No. 2140308.

Database Beilstein [online] Beilstein Institut Zur Förderung Der Chemischen Wissenschaften; XP002420037, Beilstein Registry No. 134886.

Database Beilstein [online] Beilstein Institut Zur Förderung Der Chemischen Wissenschaften; XP002420038, Beilstein Registry No. 1961007.

Database Caplus [online] Chemical Abstracts Service, Columbus, Ohio, US, XP-002387095, Database Accession No. 1981:572206, Effectiveness of Inhibitors in the Oxidation of Jet Fuel with an Initiator, abstract, Kovalev, et al.

Masada, H. and Oishi, Y., "A New Synthesis of aryl *t*-butyl Ethers," *Chem. Letters*, 57-58 (1978).

Ol'dekop, Yu. A., et al. "Simple Synthesis of the tert-butyl Ether of Phenol" Inst. Fiz-Org. Khim., Minsk, USSR. *Zhurnal Obshchei Khimii*, 50(2):475-6 (1980).

Masada, H., et al., "A New Method for the Williamson Ether Synthesis Using *t*-alkyl Halides in Nonpolar Solvents," *The Chemical Society of Japan*, 2:164-166 (1995).

Masada, H. et al., "A New Heterogeneous Williamson Synthesis of Ethers Using *t*-alkyl Substrates," *The Chemical Society of Japan* 3:275-282 (1996).

Tsvetkov, O.N., et al., "Alkylation of Phenols with Higher Olefins. Part I," *Int. Chem. Eng.* 7(1):104-121 (1967).

Sartori G., et al., "Highly Selective Mono-*tert*-butylation of Aromatic Compounds," *Chem. Ind.*, (London), (22):762-763 (1985).

Koshchii, V.A., et al. "Alkylation of Phenol by Alcohols in the Presence of Alumium Phenolate," *Org. Chem.* 24(7):1358-1361 (1988).

Chandra, K.G. and Sharma, M.M., "Alkylation of Phenol with MTBE and Other tert-butylethers:Cation Exchange Resins as Catalysts," *Catal. Lett.* 19(4):309-317 (1993).

Sakthivel, A., et al., "Vapour Phase Tertiary Butylation of Phenol Over Sulfated Zirconia Catalyst," *Catal. Lett.*, 72(3-4):225-228 (2001).

Quaschning, V., et al., "Properties of Modified Zirconia Used as Friedel-Crafts-Acylation Catalysts," *J. Catal.* 177:164-174 (1998).

Badamali, S.K., et al., "Influence of Aluminium Sources on the Synthesis and Catalytic Activity of Mesoporous AlMCM-41 Molecular Sieves," *Catal. Today* 63:291-295 (2000).

Heidekum, A., et al., "Nafion/Silica Composite Material Reveals High Catalytic Potential in Acylation Reactions," *J. Catal.* 188:230-232 (1999).

Kamitori, Y., et al., "Silica Gel as an Effective Catalyst for the Alkylation of Phenols and Some Heterocylic Aromatic Compounds," *J. Org. Chem.* 49: 4161-4165 (1984).

Armengol, E., et al., "Acid Zeolites as Catalysts in Organic Reactions, *tert*-Butylation of Anthracene, Naphthalene and Thianthrene," *Appl. Catal. A* 149:411-423 (1997).

Lalancette, J.M., et al. "Metals Intercalated in Graphite. II. The Friedel-Crafts Reactions with $ALCL_3$-Graphite," *Can. J. Chem.* 52:589-591 (1974).

Overgaag, M., et al., "Rearrangement of Alkyl Phenyl Ethers Over Dealuminated HY Zeolites Under Liquid-Phase Conditions," *Applied Catalysis A: General, Elsevier Sci.*, 175(1-2):139-146 (1998).

Devassy, B.M., et al., "Zirconia Supported Phosphotungstic Acid as an Efficient Catalyst for Resorcinol *tert*-Butylation and *n*-Heptane Hydroisomerization," *J. Mol. Catalysis A: Chemical* 221:113-119 (2004).

XP-002419239, "Discover Our World of Effects for Polyolefins," *Ciba Speciality Chemicals*, (2003).

Pirozhenko, V.V., et al., "NMR Study of Topomerization of *N*-Aroyl-*p*-Benzoquinonemonoimines," *Russian J. of Organic Chem.*, 31(11):1514-1519 (1995).

Coppinger, G.B., et al., "Photo-Fries Rearrangement of Aromatic Esters. Role of Steric and Electronic Factors" *J. of Phy. Chem.*, 70(11):3479-3489 (1966).

Spano, R., et al., "Substituted Anilides of 3-Monoethyl Ester of 4 Hydroxyisophthalic Acid," *J. of Med. Chem.*, 15(5):552-553 (1972).

Mejias, L., et al., "New Polymers From Natural Phenols Using Horseradish or Soybean Peroxidase," *Macromol. Biosci.*, 2:24-32 (2002).

Ismail, M.N. and Wazzan, A.A., "Evaluation of New Thermal Stabilizers and Antifatigue Agents for Rubber Vulcanizates," *Polymer-Plastics Tech. and Eng.*, 45:751-758 (2006).

Joossens, J., et al., "Diphenyl Phosphonate Inhibitors for the Urokinase-Type Plasminogen Activator: Optimization of the P4 Position," *J. Med. Chem.*, 49:5785-5793 (2006).

Belyaev, A., et al., "Structure-Activity Relationship of Diaryl Phosphonate Esters as Potent Irreversible Dipeptidyl Peptidase IV Inhibitors," *J. Med. Chem.*, 42:1041-1052 (1999).

Blokhin, Y.I, et al., "Phosphorylation of Dihydric Phenols with Amides of Phosphorous Acid," *Russian Chem. Bulletin*, 45(9):2250-2251 (1996).

Pätoprstý, V., et al., "$^{13}C$ NMR Study of 3,9-Di(alkylphenoxy)-2,4,8,10-tetraoxa-3,9-diphosphaspiro[5.5]undecanes," *Magnetic Resonance in Chem*, 23(2):122-126 (1985).

Singh, A. and Kaplan, D. L., "Biocatalytic Route to Ascorbic Acid-Modified Polymers for Free-Radical Scavenging," *Adv. Matter.*, 15(15):1291-1294 (2003).

Kim, T. H., et al., "Melt Free-Radical Grafting of Hindered Phenol Antioxidant onto Polyethylene," *J. Applied Polymer Science*, 77:2968-2973 (2000).

Faber, K., "Biotransformations in Organic Chemistry," A Textbook, Fourth Completely Revised and Extended Edition, Springer-Verlag pp. 347-349 (1953).

POLYMERIC ANTIOXIDANTS

RELATED APPLICATION

This application is a continuation application of U.S. patent application Ser. No. 10/408,679, filed Apr. 4, 2003 now U.S. Pat. No. 7,223,432, which claims the benefit of U.S. Provisional Application No. 60/370,468, filed on Apr. 5, 2002. The entire teachings of the above application are incorporated herein by reference.

GOVERNMENT SUPPORT

The invention was supported, in whole or in part, by a grant DMR-9986644 from National Science Foundation. The Government has certain rights in the invention.

BACKGROUND OF THE INVENTION

Synthetic antioxidant preservatives are added to a wide variety of products during processing and storage. The types of products include foods, plastics and packaging materials. When an oxidizing event takes place in a product, the antioxidant molecules rapidly react to form antioxidant radicals. This reaction protects the product from damage resulting from the oxidizing event and consequently increases the shelf life of the product. Common synthetic antioxidant preservatives include butylated hydroxyanisole (BHA), butylated hydroxytoluene (BHT), tert-butylhydroquinone (TBHQ), di-tert-butylhydroquinone (DTBHQ), and propyl gallate. There are also naturally occurring antioxidants, which include sesamol, sesamin, vitamin A and beta-carotene, vitamin E and tocopherols and vitamin C.

The use of antioxidant preservatives is particularly common in foods with significant unsaturated lipid content. These foods also contain quantities of unsaturated fatty acids. Unsaturation in fatty acids makes lipids susceptible to oxidation, which in turn leads to complex chemical changes in the lipids. These chemical changes eventually manifest themselves in the development of off-flavors (rancidity) in foods. The oxidation of unsaturated fatty acids is typically mediated by free radicals, which can be caused by heat, light, ionizing radiation, trace metals and some proteins. The use of antioxidant preservatives in lipid-containing foods minimizes rancidity, retards the formation of toxic oxidation products, allows maintenance of nutritional quality and increases the shelf life. The mechanism by which the antioxidant preservatives are believed to act involves scavenging peroxyl radicals and preventing propagation of the oxidation process. The antioxidant activity of these compounds is lost upon scavenging a free radical, so a food or other product is no longer protected from oxidation once all the antioxidant preservative has reacted with a free radical. In other words, the degree of protection from oxidation depends on the quantity of antioxidant preservative that is present.

Unfortunately, there are restrictions on the amount of synthetic antioxidant preservatives that can be added to a product, especially products intended for human or animal consumption. The U.S. Food and Drug Administration limits the amount of BHA and BHT in foods to 0.02% of total fat, because these compounds are suspected to be carcinogenic.

Consequently, there is a need for a new class of synthetic antioxidant preservatives that are less toxic to humans and animals. Also, it would be advantageous to develop an antioxidant preservative with increased potency and the ability to be readily processed with a variety of materials. Antioxidant preservatives with these improved properties would increase the shelf life and palatability of lipid-containing food items, as well as other products containing moieties (e.g., unsaturated carbon-carbon bonds) that can be damaged by free radicals.

SUMMARY OF THE INVENTION

In one embodiment, the present invention includes a method of inhibiting oxidation of a substance, comprising the step of contacting the substance with a substituted benzene antioxidant polymer. Preferably, the substituted benzene antioxidant polymer includes one or more hydroxyl or ether moieties per benzene.

In a preferred embodiment, the antioxidant polymer comprises repeat units that include one or both of Structural Formulas (I) and (II):

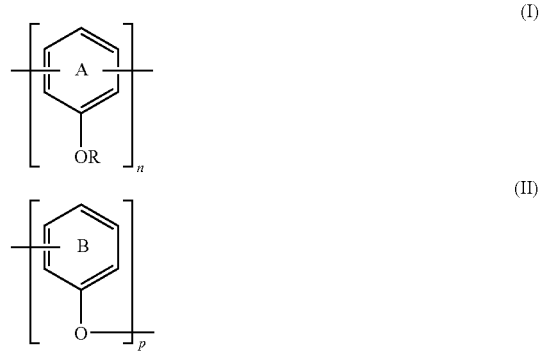

where:

R is —H or a substituted or unsubstituted alkyl, acyl or aryl group;

Ring A is substituted with at least one tert-butyl group or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;

Ring B is substituted with at least one —H and at least one tert-butyl group or substituted or unsubstituted n-alkoxycarbonyl group and optionally one or more groups selected from the group consisting of —OH, —NH, —SH, a substituted or unsubstituted alkyl or aryl group, and a substituted or unsubstituted alkoxycarbonyl group;

n is an integer equal to or greater than 2; and p is an integer equal to or greater than 0.

In another embodiment, the present invention includes an antioxidant polymer, comprising repeat units that include one or both of Structural Formulas (I) and (II):

-continued

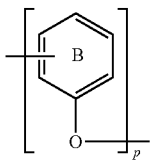
(II)

where:

R is —H or a substituted or unsubstituted alkyl, acyl or aryl group;

Ring A is substituted with at least one tert-butyl group or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;

Ring B is substituted with at least one —H and at least one tert-butyl group or substituted or unsubstituted n-alkoxycarbonyl group and optionally one or more groups selected from the group consisting of —OH, —NH, —SH, a substituted or unsubstituted alkyl or aryl group, and a substituted or unsubstituted alkoxycarbonyl group;

n is an integer equal to or greater than 2; and p is an integer equal to or greater than 0.

The antioxidant polymers can be part of a composition, such as a composition comprising an edible product and an antioxidant polymer that includes repeat units represented by one or both of Structural Formulas (I) and (II):

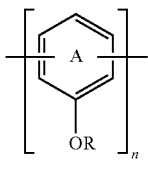
(I)

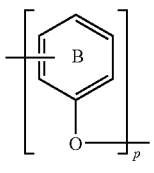
(II)

where:

R is —H or a substituted or unsubstituted alkyl, acyl or aryl group;

Ring A is substituted with at least one tert-butyl group or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;

Ring B is substituted with at least one —H and at least one tert-butyl group or substituted or unsubstituted n-alkoxycarbonyl group and optionally one or more groups selected from the group consisting of —OH, —NH, —SH, a substituted or unsubstituted alkyl or aryl group, and a substituted or unsubstituted alkoxycarbonyl group;

n is an integer equal to or greater than 2; and p is an integer equal to or greater than 0.

Another composition is used for packaging and comprises a packaging material and an antioxidant polymer that includes repeat units represented by one or both of Structural Formulas (I) and (II):

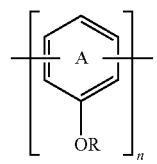
(I)

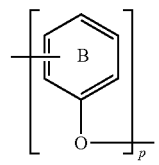
(II)

where:

R is —H or a substituted or unsubstituted alkyl, acyl or aryl group;

Ring A is substituted with at least one tert-butyl group or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;

Ring B is substituted with at least one —H and at least one tert-butyl group or substituted or unsubstituted n-alkoxycarbonyl group and optionally one or more groups selected from the group consisting of —OH, —NH, —SH, a substituted or unsubstituted alkyl or aryl group, and a substituted or unsubstituted alkoxycarbonyl group;

n is an integer equal to or greater than 2; and p is an integer equal to or greater than 0.

The present invention also includes a method of preparing an antioxidant polymer, which comprises the step of polymerizing a monomer represented by Structural Formula (XIX):

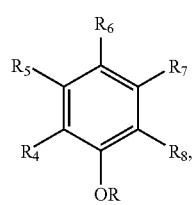
(XIX)

where:

R is —H or a substituted or unsubstituted alkyl, acyl or aryl group; and $R_4$, $R_5$, $R_6$, $R_7$ and $R_8$ are independently —H, —OH, —NH, —SH, a substituted or unsubstituted alkyl or aryl group, or a substituted or unsubstituted alkoxycarbonyl group, and provided that:

(1) at least one of $R_4$, $R_5$, $R_6$, $R_7$ and $R_8$ is a tert-butyl group or a substituted or unsubstituted alkoxycarbonyl group, and at least two of $R_4$, $R_5$, $R_6$, $R_7$ and $R_8$ are —H; or (2) at least one of $R_4$, $R_5$, $R_6$, $R_7$ and $R_8$ is a tert-butyl group or a substituted or unsubstituted alkoxycarbonyl group, at least one of $R_4$, $R_5$, $R_6$, $R_7$ and $R_8$ is a hydroxyl, alkoxy, alkoxycarbonyl or aryloxycarbonyl group, and at least one of $R_4$, $R_5$, $R_6$, $R_7$ and $R_8$ is —H.

The polymerization is typically catalyzed by an enzyme or an enzyme mimetic capable of polymerizing a substituted benzene compound in the presence of hydrogen peroxide.

One advantage of antioxidant polymers of the present invention is that they are expected to be less toxic or even non-toxic to animals, by virtue of being largely unabsorbed. Also, these polymers are generally more potent and exhibit greater thermal stability than small molecule antioxidants, so that a smaller quantity of antioxidant is typically needed to achieve the same protective effect. In addition, the antioxidant polymers can be blended into another polymeric material or can form a thin film coating on the material, and unlike a small molecule antioxidant, diffusion out of the polymeric material will most often occur slowly. The invention also provides a largely environmentally-safe method for preparing these antioxidant polymers.

DETAILED DESCRIPTION OF THE INVENTION

Figure 1:
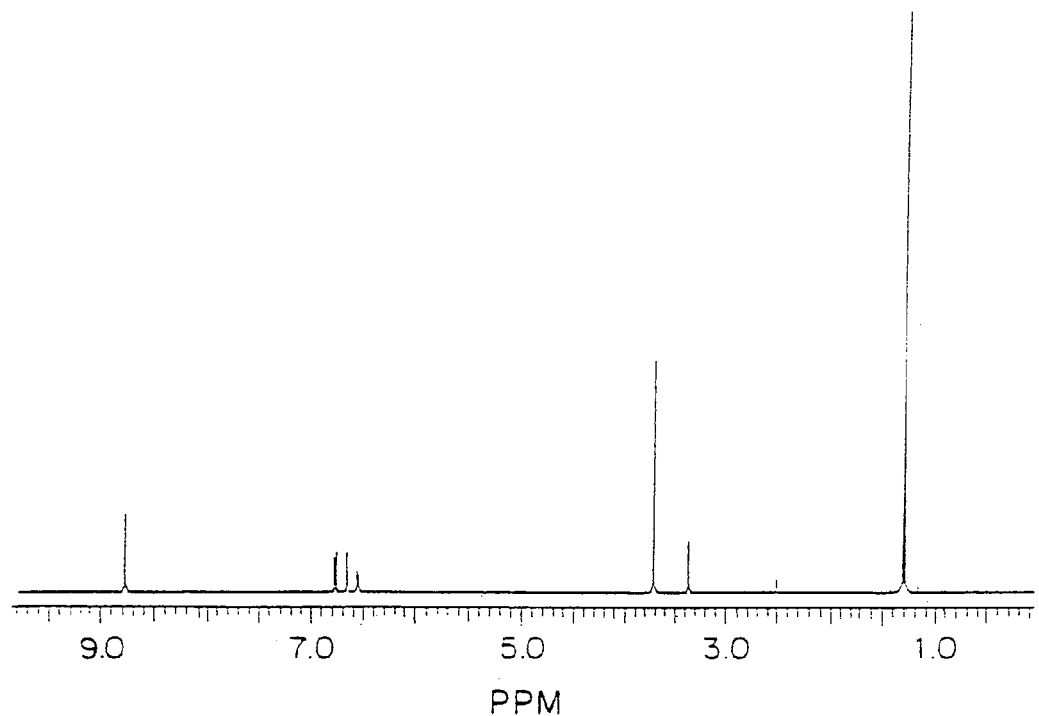
FIG. 1 shows a high resolution 500 MHz $^1$H NMR spectrum of 2-tert-butyl-4-hydroxyanisole (2-BHA).

The present invention is generally directed to a method of inhibiting the oxidation of a substance, which involves contacting the substance with a substituted benzene antioxidant polymer. The invention is also directed to the substituted benzene antioxidant polymers, various compositions containing such antioxidant polymers, and methods of preparing such antioxidant polymers.

For purposes of the present invention, a "method of inhibiting oxidation" is defined herein as a method that inhibits the propagation of a free radical-mediated process. Free radicals can be generated by heat, light, ionizing radiation, metal ions and some proteins and enzymes. Inhibiting oxidation also includes inhibiting reactions caused by the presence of oxygen, ozone or another compound capable of generating these gases or reactive equivalents of these gases.

Repeat units of the antioxidant polymers of the invention include substituted benzene molecules. These benzene molecules are typically based on phenol or a phenol derivative, such that they have at least one hydroxyl or ether functional group. Preferably, the benzene molecules have a hydroxyl group. The hydroxyl group is not restricted to being a free hydroxyl group, and the hydroxyl group can be protected or have a cleavable group attached to it (e.g., an ester group).

Such cleavable groups can be released under certain conditions (e.g., changes in pH), with a desired shelf life or with a time-controlled release (e.g., measured by the half-life), which allows one to control where and/or when an antioxidant polymer is able to exert its antioxidant effect.

Substituted benzene repeat units of an antioxidant polymer of the invention are also typically substituted with a bulky alkyl group or an n-alkoxycarbonyl group. Preferably, the benzene monomers are substituted with a bulky alkyl group. More preferably, the bulky alkyl group is located ortho or meta to the hydroxyl group on the benzene ring. A "bulky alkyl group" is defined herein as an alkyl group that is branched alpha- or beta- to the benzene ring. Preferably, the alkyl group is branched alpha to the benzene ring. More preferably, the alkyl group is branched twice alpha to the benzene ring, such as in a tert-butyl group. Other examples of bulky alkyl groups include isopropyl, 2-butyl, 3-pentyl, 1,1-dimethylpropyl, 1-ethyl-1-methylpropyl and 1,1-diethylpropyl. The bulky alkyl groups are preferably unsubstituted, but they can be substituted with a functional group that does not interfere with the antioxidant activity of the molecule or the polymer. Straight chained alkoxylcarbonyl groups include methoxycarbonyl, ethoxycarbonyl, n-propoxycarbonyl, n-butoxycarbonyl and n-pentoxycarbonyl. n-propoxycarbonyl is a preferred group. Similar to the bulky alkyl groups, n-alkoxycarbonyl groups are optionally substituted with a functional group that does not interfere with the antioxidant activity of the molecule or the polymer.

Preferred polymers of the present invention include repeat units represented by one or both of Structural Formulas (III) and (IV):

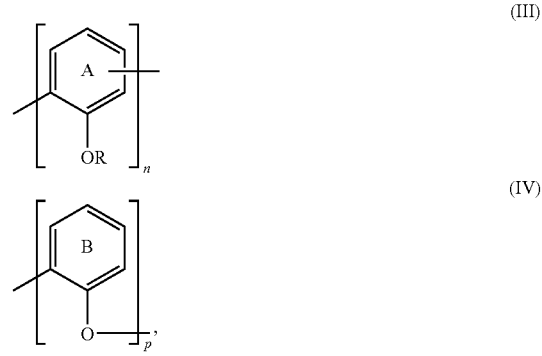

where Rings A and B are substituted as described above and n and p are as defined above.

Preferably, Ring A and Ring B in Structural Formulas (I) to (IV) are each substituted with at least one tert-butyl group.

The polymer advantageously includes repeat units represented by one or more of Structural Formulas (Va), (Vb), (Vc), (VIa), (VIb) and (VIc):

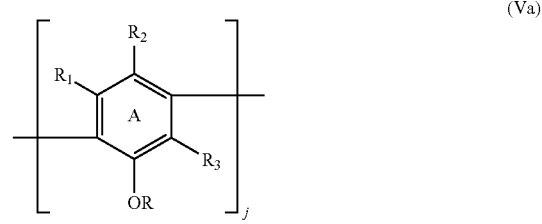

-continued

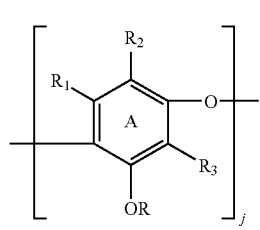
(Vb)

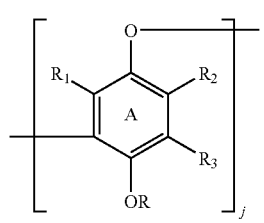
(Vc)

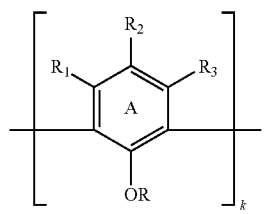
(VIa)

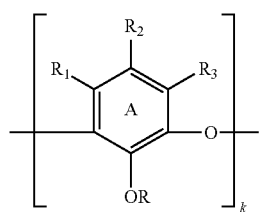
(VIb)

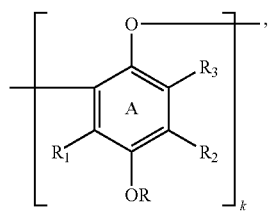
(VIc)

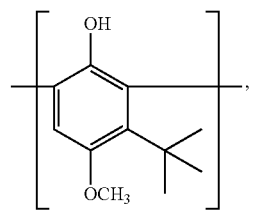
(VII)

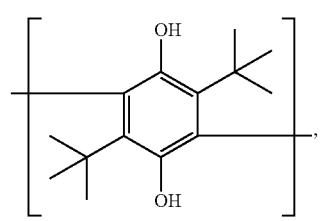
(VIII)

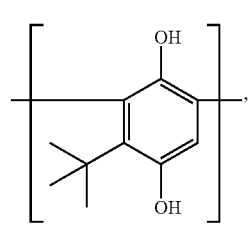
(IX)

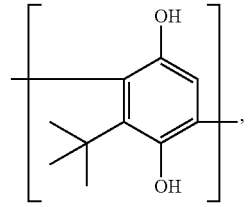
(X)

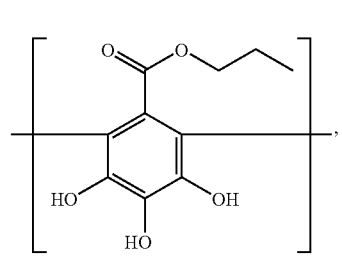
(XI)

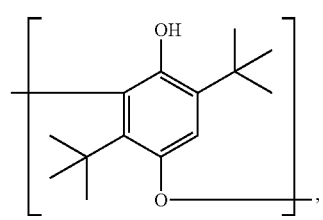
(XII)

where $R_1$, $R_2$ and $R_3$ are independently selected from the group consisting of —H, —OH, —NH, —SH, a substituted or unsubstituted alkyl or aryl group, and a substituted or unsubstituted alkoxycarbonyl group, provided that at least one of $R_1$, $R_2$ and $R_3$ is a tert-butyl group; and j and k are independently integers of zero or greater, such that the sum of j and k is equal to or greater than 2.

In a preferred embodiment, R is —H or —CH$_3$; $R_2$ is —H, —OH, or a substituted or unsubstituted alkyl group; or both.

Specific examples of repeat units included in polymers of the present invention are represented by one of the following structural formulas:

-continued

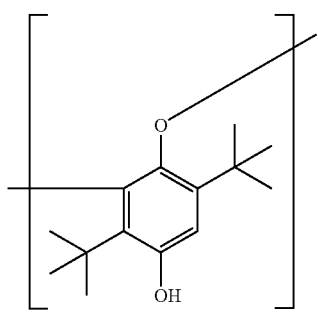 (XIII)

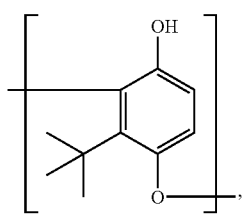 (XIV)

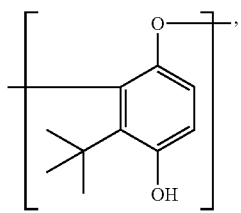 (XV)

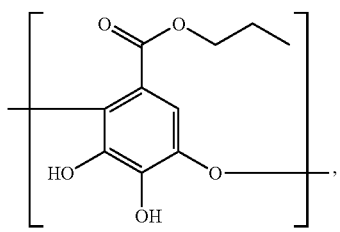 (XVI)

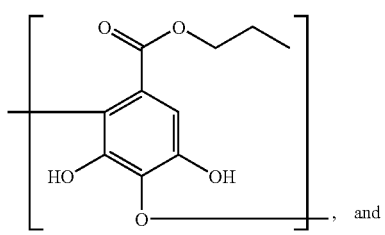 (XVII), and

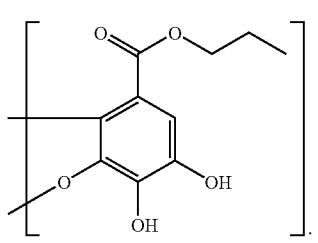 (XVIII)

Advantageously, a polymer of the present invention consists of repeat units represented by one or more of Structural Formulas (VII) to (XVIII).

Antioxidant polymers of the present invention are prepared by polymerizing a molecule represented by Structural Formula (XIX):

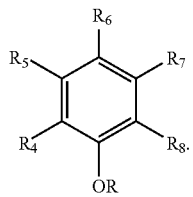 (XIX)

Preferably, a molecule represented by Structural Formula (XIX) has one, two, three, four or five of the following features. In the first feature, at least one of $R_5$, $R_7$ and $R_8$ is a tert-butyl group. In the second feature, $R_4$ is —H. In the third feature, one or both of $R_7$ and $R_8$ is —H. In the fourth feature, R is —H or —CH$_3$. In the fifth feature, $R_6$ is —H, —OH or a substituted or unsubstituted alkyl group. More preferably, a molecule represented by Structural Formula (XIX) has the first and second features; the first, second and third features; the first, second, third and fourth features; or the first, second, third, fourth and fifth features.

Specific examples of monomers that can be polymerized to form an antioxidant polymer of the present invention are represented by one of the following structural formulas:

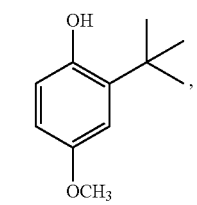 (XX)

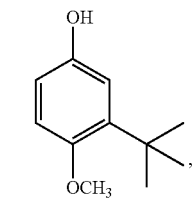 (XXI)

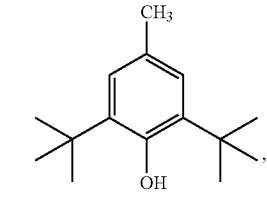 (XXII)

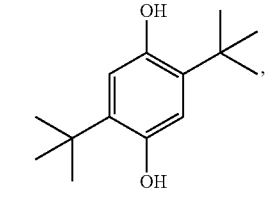 (XXIII)

-continued

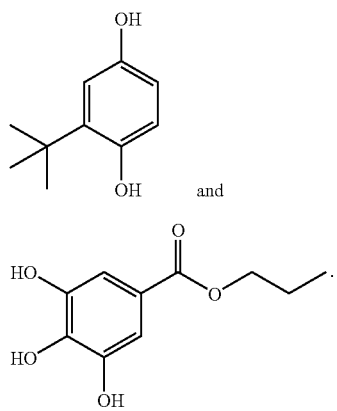

(XXIV)

and (XXV)

Antioxidant polymers of the present invention have two or more repeat units, preferably greater than about five repeat units. The molecular weight of the polymers disclosed herein is generally selected to be appropriate for the desired application. Typically, the molecular weight is greater than about 500 atomic mass units (amu) and less than about 2,000,000 amu, greater than about 1000 amu and less than about 100,000, greater than about 2,000 amu and less than about 10,000, or greater than about 2,000 amu and less than about 5,000 amu. For food or edible products (e.g., products fit for human consumption), the molecular weight is advantageously selected to be large enough so that an antioxidant polymer cannot be absorbed by the gastrointestinal tract, such as greater than 1000 amu. For antioxidant polymers blended with a polymeric material, the molecule weight is advantageously selected such that the rate of diffusion of the antioxidant polymer through the polymeric material is slow relative to the expected lifetime of the polymeric material.

Antioxidant polymers of the present invention can be either homopolymers or copolymers. A copolymer preferably contains two or more or three or more different repeating monomer units, each of which has varying or identical antioxidant properties. The identity of the repeat units in a copolymer can be chosen to modify the antioxidant properties of the polymer as a whole, thereby giving a polymer with tunable properties. The second, third and/or further repeat units in a copolymer can be either a synthetic or natural antioxidant.

Antioxidant polymers of the present invention are typically insoluble in aqueous media. The solubility of the antioxidant polymers in non-aqueous media (e.g., oils) depends upon the molecular weight of the polymer, such that high molecular weight polymers are typically sparingly soluble in non-aqueous media. When an antioxidant polymer of the invention is insoluble in a particular medium or substrate, it is preferably well-mixed with that medium or substrate.

Antioxidant polymers of the present invention can be branched or linear, but are preferably linear. Branched antioxidant polymers can only be formed from benzene molecules having three or fewer substituents (e.g., three or more hydrogen atoms), as in Structural Formulas (XX), (XXI) and (XXIV).

Polymerization of the monomers is catalyzed by a natural or synthetic enzyme or an enzyme mimetic capable of polymerizing a substituted benzene compound in the presence of hydrogen peroxide, where the enzyme or enzyme mimetic typically have a heme or related group at the active site. One general class of enzymes capable of catalyzing this reaction is commonly referred to as the peroxidases. Horseradish peroxidase, soybean peroxidase, *Coprinus cinereus* peroxidase, and *Arthromyces ramosus* peroxidase are readily available peroxidases. Other enzymes capable of catalyzing the reaction include laccase, tyrosinase, and lipases. Suitable enzymes are able to catalyze the formation of a carbon-carbon bond and/or a carbon-oxygen-carbon bond between two aryl (e.g., phenyl, phenol) groups when a peroxide (e.g., hydrogen peroxide or an organic peroxide) is present. A subunit or other portion of a peroxidase is acceptable, provided that the active site of the enzyme is still functional. Enzyme mimetics typically correspond to a part of an enzyme, so that they can carry out the same reaction as the parent enzyme but are generally smaller than the parent enzyme. Also, enzyme mimetics can be designed to be more robust than the parent enzyme, such as to be functional under a wider variety of conditions (e.g., different pH range, aqueous, particularly aqueous and non-aqueous solvents) and less subject to degradation or inactivation. Suitable enzyme mimetics include hematin, tyrosinase-model complexes and iron-salen complexes. Hematin, in particular, can be functionalized to allow it to be soluble under a wider variety of conditions is disclosed in U.S. application Ser. No. 09/994,998, filed Nov. 27, 2001 now abandoned, the contents of which are incorporated herein by reference.

Polymerizations of the present invention can be carried out under a wide variety of conditions. The pH is often between about pH 1.0 and about pH 12.0, typically between about pH 6.0 and about pH 11.0. The temperature is above about 0° C., such as between about 0° C. and about 45° C. or between about 15° C. and about 30° C. (e.g., room temperature). The solvent can be aqueous (preferably buffered), organic, or a combination thereof. Organic solvents are typically polar solvents such as ethanol, methanol, isopropanol, dimethylformamide, dioxane, acetonitrile, and diethyl ether. The concentration of monomer or comonomers is typically 0.001 M or greater. Also, the concentration of buffer is typically 0.001 M or greater.

Polymerizations of the invention use a catalytic amount of one of the enzymes or enzyme mimetics described above, which can be between about one unit/mL and five units/mL, where one unit will form 1.0 mg purpurogallin from pyrogallol in 20 seconds at pH 6.0 at $20^B$C. Preferably, the enzyme or enzyme mimetic is added to the solution after addition of the antioxidant monomer or comonomers. A peroxide is then added incrementally to the reaction mixture, such as not to de-activate the enzyme or enzyme mimetic, until an amount approximately stoichiometric with the amount of antioxidant monomer or comonomers has been added.

Although the enzyme or enzyme mimetic is responsible for formation of phenol-based free radicals needed for chain propagation, the coupling of radicals to form a polymer chain is controlled by the phenoxy radical and solvent chemistries. Further details regarding the coupling of phenoxy radicals can be found in "Enzymatic catalysis in monophasic organic solvents," Dordick, J. S., *Enzyme Microb. Technol.* 11:194-211 (1989), the contents of which are incorporated herein by reference. Coupling between substituted benzene monomers typically occurs ortho and/or para to a hydroxyl group. Coupling rarely occurs meta to a hydroxyl group.

Polymerization preferably results in the formation of C—C bonds. Preferred polymers will contain at least about 95% C—C bonds, at least about 90% C—C bonds, at least about 80% C—C bonds, at least about 70% C—C bonds, at least about 60% C—C bonds or at least about 50% C—C bonds. Especially preferred polymers contain about 100% C—C bonds.

Antioxidant polymers of the present invention can be present in a wide variety of compositions where free radical mediated oxidation leads to deterioration of the quality of the composition, including edible products such as oils, foods (e.g., meat products, dairy products, cereals, etc.), and other product's containing fats or other compounds subject to oxidation. Antioxidant polymers can also be present in plastics and other polymers, elastomers (e.g., natural or synthetic rubber), petroleum products (e.g., fossil fuels such as gasoline, kerosene, diesel oil, heating oil, propane, jet fuel), lubricants, paints, pigments or other colored items, soaps and cosmetics (e.g., creams, lotions, hair products). The antioxidant polymers can be used to coat a metal as a rust and corrosion inhibitor. Antioxidant polymers additionally can protect antioxidant vitamins (Vitamin A, Vitamin C, Vitamin E) and pharmaceutical products from degradation. In food products, the antioxidant polymers will prevent rancidity. In plastics, the antioxidant polymers will prevent the plastic from becoming brittle and cracking.

Antioxidant polymers of the present invention can be added to oils to prolong their shelf life and properties. These oils can be formulated as vegetable shortening or margarine. Oils generally come from plant sources and include cottonseed oil, linseed oil, olive oil, palm oil, corn oil, peanut oil, soybean oil, castor oil, coconut oil, safflower oil, sunflower oil, canola (rapeseed) oil and sesame oil. These oils contain one or more unsaturated fatty acids such as caproleic acid, palmitoleic acid, oleic acid, vaccenic acid, elaidic acid, brassidic acid, erucic acid, nervonic acid, linoleic acid, eleosteric acid, alpha-linolenic acid, gamma-linolenic acid, and arachidonic acid, or partially hydrogenated or trans-hydrogenated variants thereof. Antioxidant polymers of the present invention are also advantageously added to food or other consumable products containing one or more of these fatty acids.

The shelf life of many materials and substances contained within the materials, such as packaging materials, are enhanced by the presence of an antioxidant polymer of the present invention. The addition of an antioxidant polymer to a packaging material is believed to provide additional protection to the product contained inside the package. In addition, the properties of many packaging materials themselves, particularly polymers, are enhanced by the presence of an antioxidant regardless of the application (i.e., not limited to use in packaging). Common examples of packaging materials include paper, cardboard and various plastics and polymers. A packaging material can be coated with an antioxidant polymer (e.g., by spraying the antioxidant polymer or by applying as a thin film coating), blended with or mixed with an antioxidant polymer (particularly for polymers), or otherwise have an antioxidant polymer present within it. In one example, a thermoplastic such as polyethylene, polypropylene or polystyrene is melted in the presence of an antioxidant polymer in order to minimize its degradation during the polymer processing. An antioxidant polymer can also be co-extruded with a polymeric material.

An alkyl group is a saturated hydrocarbon in a molecule that is bonded to one other group in the molecule through a single covalent bond from one of its carbon atoms. Examples of lower alkyl groups include methyl, ethyl, n-propyl, isopropyl, n-butyl, sec-butyl and tert-butyl. An alkoxy group is a substituted or unsubstituted alkyl group where an oxygen atom connects the alkyl group and one other group. An acyl group is a substituted or unsubstituted alkyl group that contains a terminal carbonyl moiety.

Aryl groups include carbocyclic aryl groups such as phenyl, 1-naphthyl, 2-naphthyl, 1-anthracyl and 2-anthracyl, and heterocyclic aryl groups such as N-imidazolyl, 2-imidazole, 2-thienyl, 3-thienyl, 2-furanyl, 3-furanyl, 2-pyridyl, 3-pyridyl, 4-pyridyl, 2-pyrimidyl, 4-pyrimidyl, 2-pyranyl, 3-pyranyl, 3-pyrazolyl, 4-pyrazolyl, 5-pyrazolyl, 2-pyrazinyl, 2-thiazole, 4-thiazole, 5-thiazole, 2-oxazolyl, 4-oxazolyl and 5-oxazolyl.

Aryl groups also include fused polycyclic aromatic ring systems in which a carbocyclic aromatic ring or heteroaryl ring is fused to one or more other heteroaryl rings. Examples include 2-benzothienyl, 3-benzothienyl, 2-benzofuranyl, 3-benzofuranyl, 2-indolyl, 3-indolyl, 2-quinolinyl, 3-quinolinyl, 2-benzothiazole, 2-benzooxazole, 2-benzimidazole, 2-quinolinyl, 3-quinolinyl, 1-isoquinolinyl, 3-quinolinyl, 1-isoindolyl and 3-isoindolyl.

Examples of suitable substituents on an alkyl, aryl or acyl group may include, for example, halogen (—Br, —Cl, —I and —F), —$OR_a$, —CN, —$NO_2$, —$N(R_a)_2$, —$COOR_a$, —$CON(R_a)_2$, —$SO_kR_a$ (k is 0, 1 or 2) and —NH—C(=NH)—$NH_2$. An alkyl group can also have =O or =S as a substituent. Each $R_a$ is independently —H, an alkyl group, a substituted alkyl group, a benzyl group, a substituted benzyl group, an aryl group or a substituted aryl group. A substituted benzylic group or aryl group can also have an alkyl or substituted alkyl group as a substituent. A substituted alkyl group can also have a benzyl, substituted benzyl, aryl or substituted aryl group as a substituent. A substituted alkyl, substituted aryl or substituted acyl group can have more than one substituent.

The following examples are not intended to be limiting in any way.

EXEMPLIFICATION

Example 1

Preparation of poly(2-tert-butyl-4-hydroxyanisole)

Horseradish peroxidase-catalyzed polymerization of 2-tert-butyl-4-hydroxyanisole (2-BHA) was carried out according to the procedure of Holland, H. L., in *Organic Synthesis with Oxidative Enzymes*, VCH Publishers, Inc., 1992, the contents of which are incorporated herein by reference. Briefly, 2-BHA (100 mg, 0.56 mmol) was added to a 1:1 (v/v, 6 mL) solution of methanol and 0.01 M sodium phosphate buffer (pH 7), along with horseradish peroxidase, at room temperature. The polymerization was initiated by incremental addition of a stoichiometric amount of hydrogen peroxide (5% aqueous solution, 35 microliters, 0.56 mmol) over a period of 3 hours. After complete addition of the hydrogen peroxide, the reaction was allowed to continue for another 24 hours. The solvent was evaporated by freeze-drying. The polymer was washed thoroughly with aqueous methanol (1:1 v/v) to remove the enzyme and phosphate salts, followed by drying under vacuum.

Figure 2:
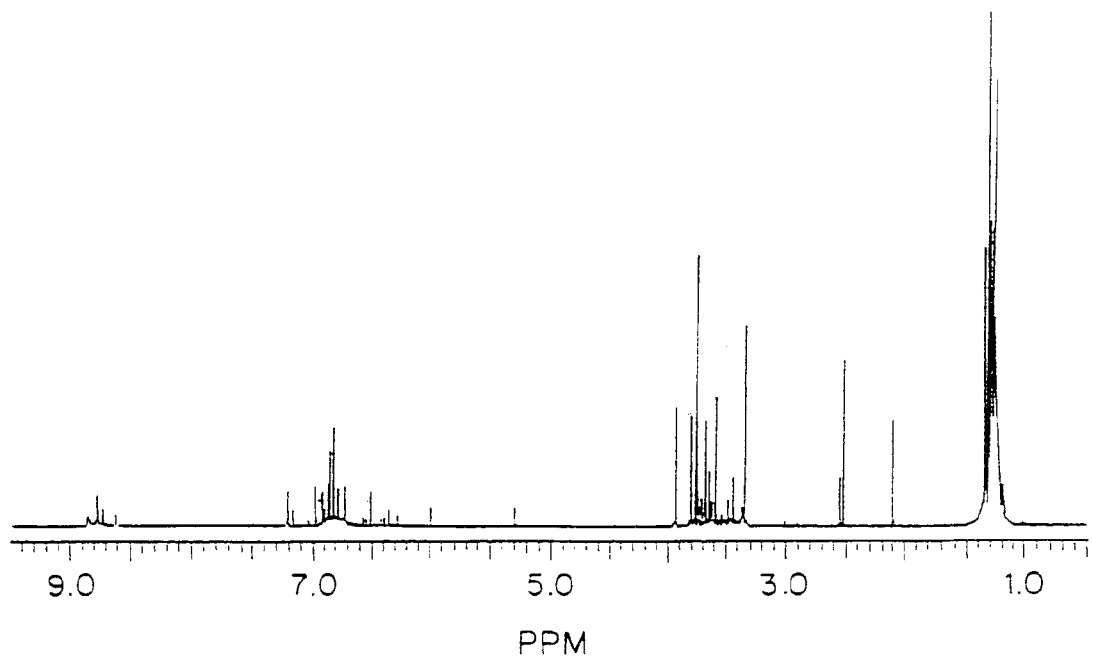
FIG. 2 shows a high resolution 500 MHz $^1$H NMR spectrum of enzymatically polymerized poly(2-BHA).
Figure 3:
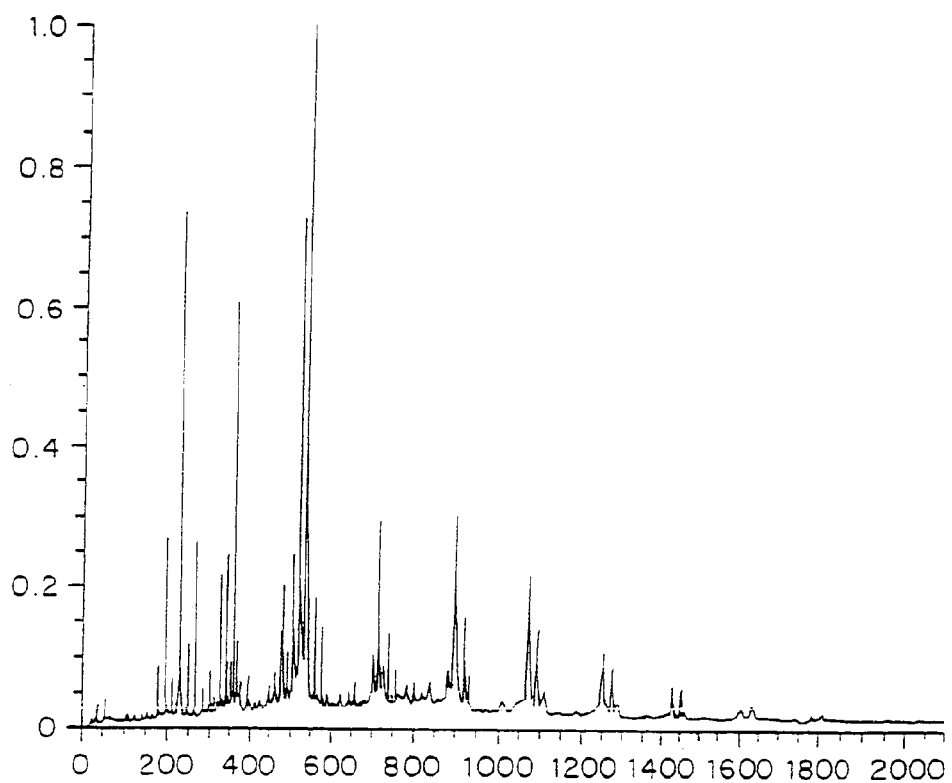
FIG. 3 shows the matrix assisted laser desorption ionization time-of-flight mass spectrum (MALDI-TOF-MS) of the poly(2-BHA), which indicates that a distribution of polymeric species were formed.
Figure 4:
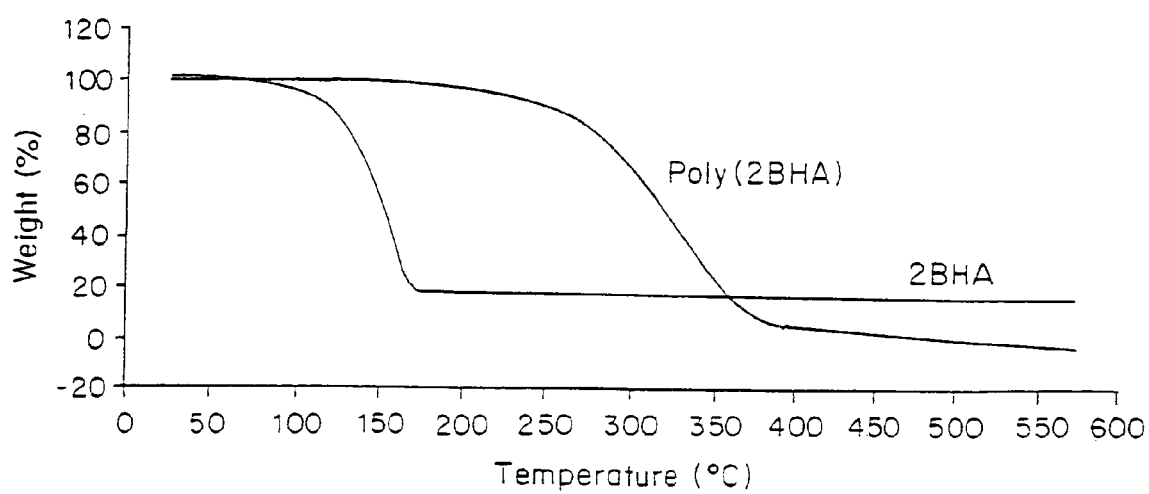
FIG. 4 shows the comparative thermogravimetric analysis of 2-BHA and poly(2-BHA).

The 500 MHz $^1$H NMR spectra of monomeric and polymeric 2-BHA are shown in FIGS. 1 and 2, respectively. The NMR spectrum of the polymer shows clear changes from that of the monomer, such as the methoxy proton changing from a single peak at 3.7 ppm to a distribution of resonances between 3.4 and 3.8 ppm, which corresponds to the molecular weight of the polymer product. The distribution of molecular weights observed in the MALDI-TOF-MS spectrum (FIG. 3) also confirms formation of a polymer. A $^{13}$C spectrum of poly(2-BHA) showed new peaks at 115.5, 116.2, 138.2 and 148.2 ppm, which suggests the presence of C—C and C—O—C couplings in the polymer (data not shown). Thermogravimetric analysis (TGA) profiles (FIG. 4) of 2-BHA showed there was about 15% mass loss up to about 125° C. and TGA of poly(2-BHA) showed there was about 15% mass loss up to about 275° C., which indicates a considerable improvement in thermal stability for the polymer.

Example 2

Preparation of Poly(tert-butyl-hydroxyquinone)

Figure 5:
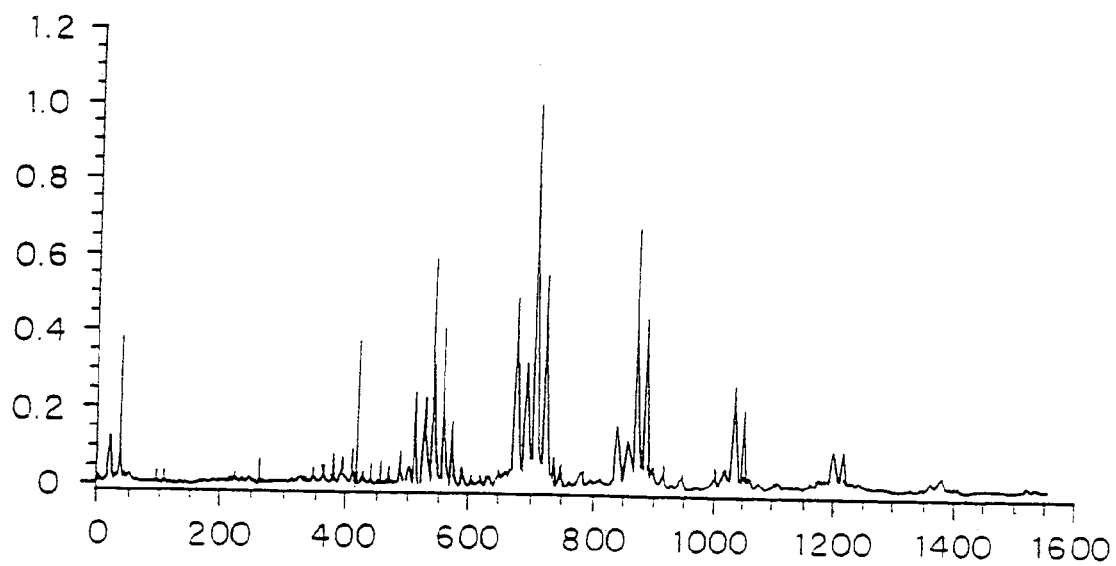
FIG. 5 shows the matrix assisted laser desorption ionization time-of-flight mass spectrum (MALDI-TOF-MS) of the poly(tert-butyl-hydroxyquinone) (poly(TBHQ)), which indicates that a distribution of polymeric species were formed.

Poly(tert-butyl-hydroxyquinone) was prepared by a variation of the method described in Example 1. The distribution of molecular weights observed in the MALDI-TOF-MS spectrum (FIG. 5) confirms formation of a polymer.

Example 3

Comparison of Antioxidant Activity of Monomers Versus Polymers

Figure 6:
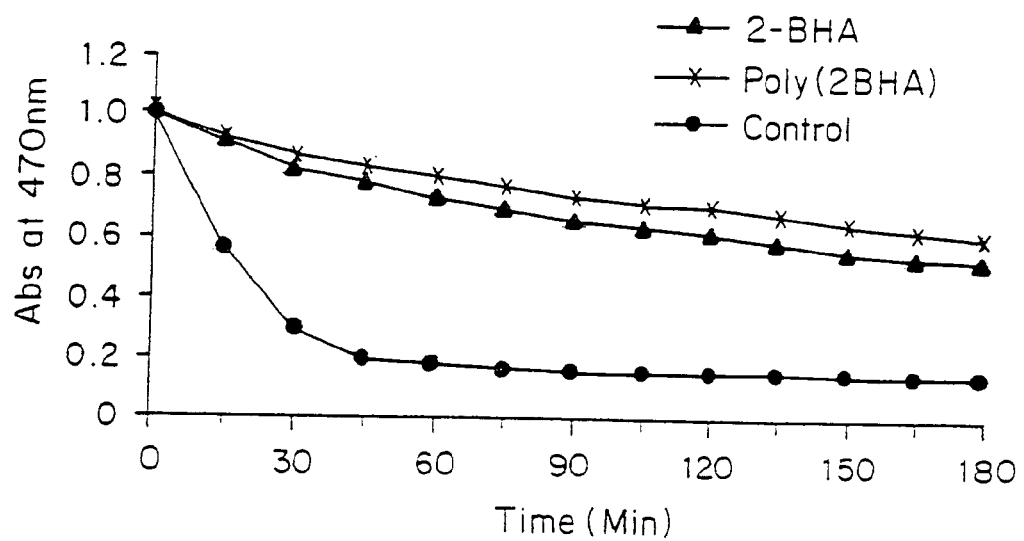
FIG. 6 shows the antioxidant activity profile of 2-BHA and poly(2-BHA) at 100 ppm in the beta-carotene/linoleate model system described in Example 2.

The antioxidant activity of monomers and enzymatically-prepared polymeric antioxidants was compared by measuring the bleaching of a beta-carotene system. In the model system, beta-carotene undergoes rapid discoloration in the absence of an antioxidant. The assay and measurements were conducted according to the procedure described in Jayaprakasha, G. K., et al. *Food Chemistry* 73: 285-290 (2001) and Hidalgo, M. E., et al. *Phytochemistry* 37: 1585-1587 (1994), the contents of which are incorporated herein by reference. Briefly, beta-carotene (0.2 mg), linoleic acid (20 mg), and 200 mg of Tween-40 (polyoxyethylene sorbitan monopalmitate) were dissolved in 0.5 mL of chloroform. The chloroform was removed under vacuum and the resulting mixture was immediately diluted with 10 mL of distilled water and mixed well for 1-2 minutes. The resulting emulsion was further made up to 50 mL with oxygenated water. Aliquots (4 mL) of the emulsion were mixed with 0.2 mL of test sample (monomer or polymer) in dimethylformamide (DMF), so that there were 100 ppm of monomer or polymer present in the aliquot. A control was prepared by mixing 0.2 mL of DMF with 4 ml of the above emulsion. The samples were incubated at 50° C. The absorbance of all samples at 470 nm was taken initially (t=0) and continued up to 180 minutes at 15 minute intervals. Data from the assay of 2-BHA and its polymer are shown in FIG. 6. Antioxidant activity is calculated based on the formula:

Antioxidant Activity=$100(1-(A_o-A_t)/(A^1_o-A^1_t))$, $A_o$=absorbance of the test sample at zero time,
$A^1_o$=absorbance of the control at zero time,
$A_t$=absorbance of the test sample at time t (180 min), and
$A^1_t$=absorbance of the control at time t (180 min).

The results for several monomer-polymer pairs are shown in the following table:

| Compound | Monomer Activity | Polymer Activity | % Increase in Polymer Activity |
|---|---|---|---|
| 2-tert-butyl-4-hydroxyanisole | 44.24 | 53.74 | 21.5 |
| tert-butyl-hydroxyquinone | 5.77 | 9.7 | 68.1 |
| 4-azophenylphenol | 5.4 | 25.5 | 372 |
| phenol | 2.1 | 10.0 | 376 |
| 3-hydroxybenzyl alcohol | 1.0 | 5.0 | 400 |
| 4-methylphenol | 0.9 | 5.0 | 455 |

Example 4

Antioxidant Activity of Monomer Versus Polymer

The antioxidant activity of several other antioxidant monomer/polymer pairs were determined by the procedure described in Example 3.

| Compound | % Antioxidant Activity of Monomer | % Antioxidant Activity of Polymer |
|---|---|---|
| 3-Hydroxybenzyl alcohol | 1.0 | 5.0 |
| 4-Methylphenol | 0.9 | 5.0 |
| Phenol | 2.1 | 10.0 |
| 4-Azophenylphenol | 5.4 | 25.5 |

Example 5

Stability of Cooking Oils

Corn and canola oils were blended with amounts of tert-butyl-hydroxyquinone (TBHQ) and poly(TBHQ), such that the concentration of phenol moieties was equal. The oils were heated to frying temperature (190° C.) and their oil stability index was measured. The oil stability index (American Oil Chemists' Society Cd 126-92) measures the amount of time before the oil begins to rapidly oxidize. A greater length of time indicates an oil with a greater antioxidant capacity, which likely corresponds to a longer potential shelf life.

| Oil | Control | TBHQ | Poly(TBHQ) |
|---|---|---|---|
| Canola | 7.8 hours | 10.8 hours | 19.2 hours |
| Corn | 3.6 hours | 6.6 hours | 9.0 hours |

The above table shows that polymerized TBHQ is more effective in preventing oxidation of the oils, as compared to monomeric TBHQ. Both TBHQ and poly(TBHQ) are significantly more stable than oil without an added antioxidant.

Example 6

Safety of Antioxidant Polymers

A study was conducted based upon the standards of OECD Guidelines for Testing of Chemicals, OECD 423. Ten Sprague-Dawley albino rats were administered with 2000 mg/kg body weight poly(TBHQ) as a single dose via gastric gavage. After administration, the animals were returned to their cages and observed for signs of toxicity for up to 14 days. Body weights were determined prior to dosing and on the day of death or prior to terminal sacrifice. A second study was performed using three female rats with 500 mg/kg body weight of poly(TBHQ).

Three of the five female rats administered with 2000 mg/kg poly(TBHQ) died prior to completion of the study. All animals manifested clinical signs of toxicity including piloerection, nasal discharge, chromodacryorrhea and lethargy. In the animals that did not survive 14 days, the intestines were inflamed. None of the surviving animals showed abnormal signs at gross necropsy. The three rats administered with 500 mg/kg poly(TBHQ) survived the duration of the study and did not manifest any clinical signs of toxicity.

Based on this study, the oral LD50 of poly(TBHQ) was determined to be between 500 mg/kg and 2000 mg/kg. For comparison, the oral LD50 of sodium chloride is about 3000 mg/kg and the oral LD50 of sodium cyanide is about 4 mg/kg. Thus, poly(TBHQ) has a relatively low toxicity to rats.

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising a pharmaceutical product and an antioxidant polymer that includes repeat units represented by one or both of Structural Formulas (I) and (II):

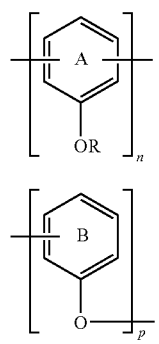

wherein:
  R is —H or a substituted or unsubstituted alkyl, acyl or aryl group;
  Ring A is substituted with at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group; and
  Ring B is substituted with at least one —H and at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;
  n is an integer equal to or greater than 2; and
  p is an integer equal to or greater than 0.

2. The composition of claim 1, wherein the antioxidant polymer includes at least one repeat unit selected from the group consisting of:

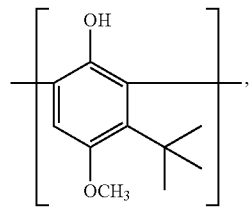

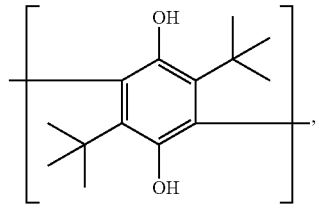

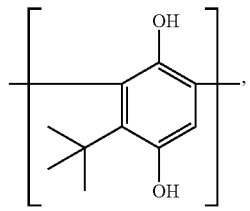

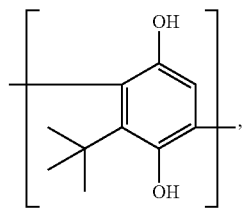

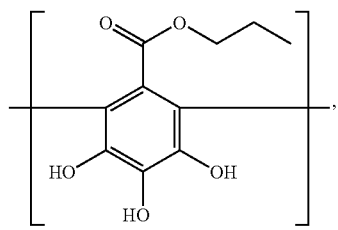

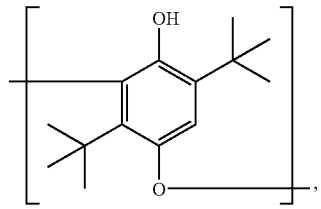

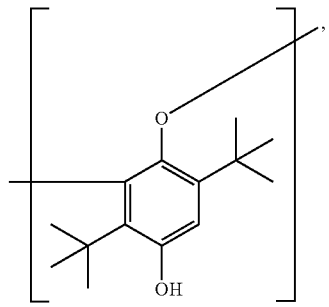

-continued (XIV)
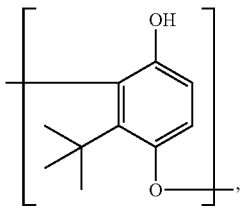

(XV)
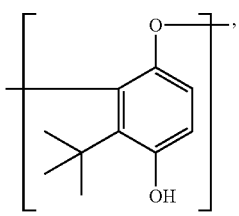

(XVI)
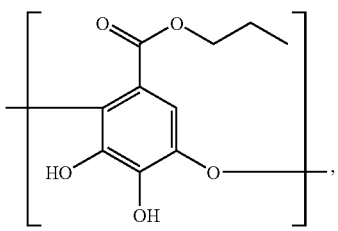

(XVII)
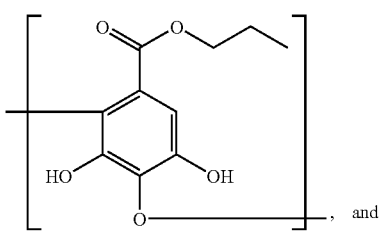, and (XVIII)
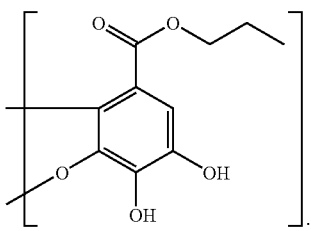.

3. A composition, comprising a petroleum product and an antioxidant polymer that includes repeat units represented by one or both of Structural Formulas (I) and (II):

(I)
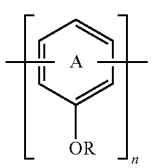

-continued (II)
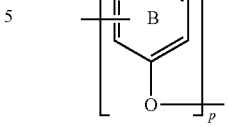

wherein:

R is —H or a substituted or unsubstituted alkyl, acyl or aryl group;

Ring A is substituted with at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group; and Ring B is substituted with at least one —H and at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;

n is an integer equal to or greater than 2; and p is an integer equal to or greater than 0.

4. The composition of claim 3, wherein the petroleum product is fossil fuel.

5. The composition of claim 4, wherein the fossil fuel is selected from the group consisting of gasoline, kerosene, diesel oil, heating oil, propane and jet fuel.

6. The composition of claim 3, wherein the antioxidant polymer includes at least one repeat unit selected from the group consisting of:

(VII)
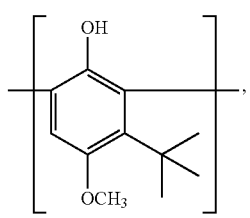

(VIII)
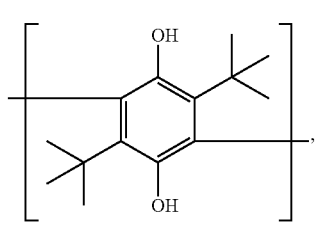

(IX)
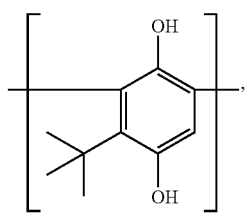

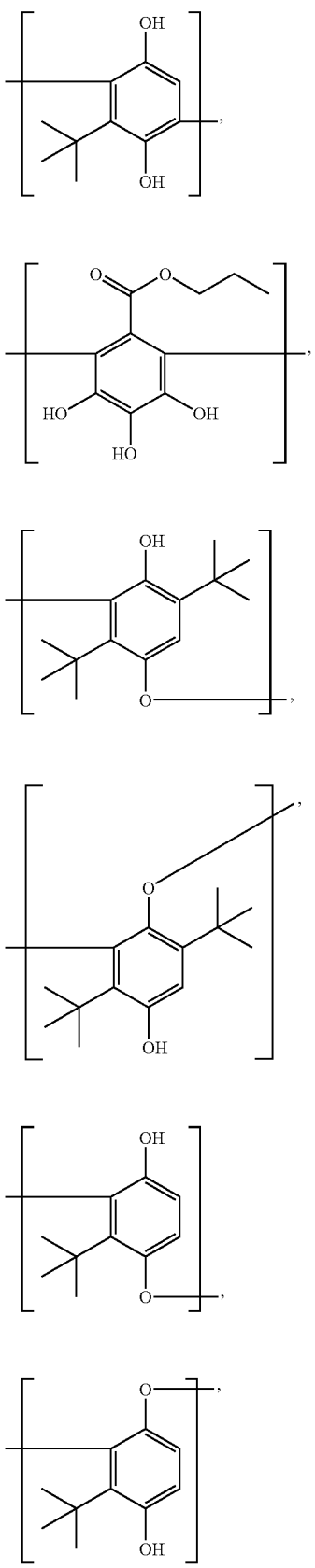

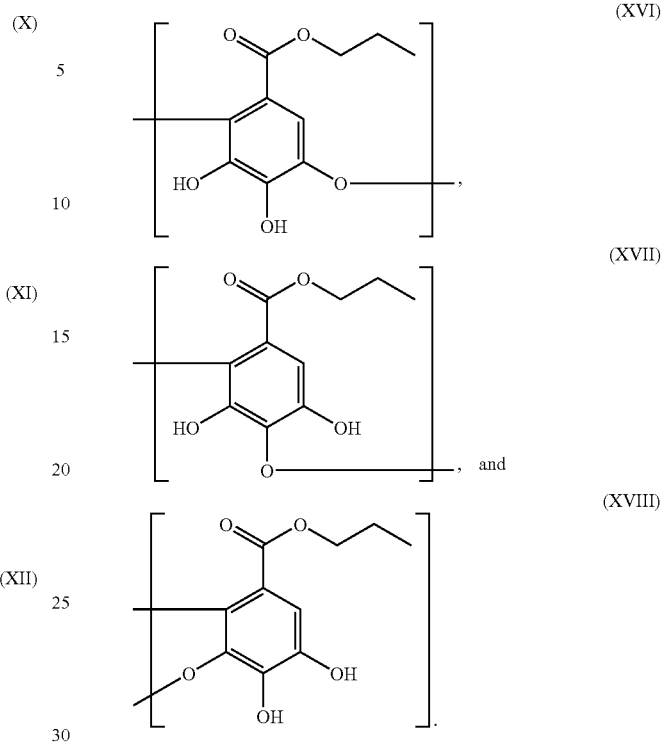

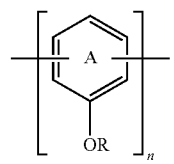

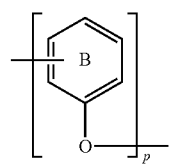

7. A composition, comprising a cosmetic product and an antioxidant polymer that includes repeat units represented by one or both of Structural Formulas (I) and (II):

$$\left[ \begin{array}{c} \phantom{x} \\ A \\ OR \end{array} \right]_n \quad (I)$$

$$\left[ \begin{array}{c} \phantom{x} \\ B \\ O \end{array} \right]_p \quad (II)$$

wherein:
R is —H or a substituted or unsubstituted alkyl, acyl or aryl group;
Ring A is substituted with at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group; and
Ring B is substituted with at least one —H and at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;
n is an integer equal to or greater than 2; and
p is an integer equal to or greater than 0.

8. The composition of claim 7, wherein the antioxidant polymer includes at least one repeat unit selected from the group consisting of:
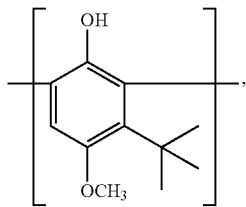
(VII)
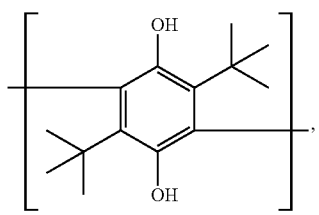
(VIII)
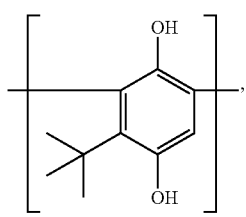
(IX)
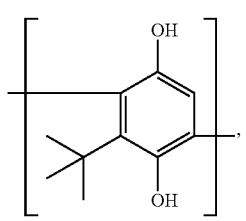
(X)
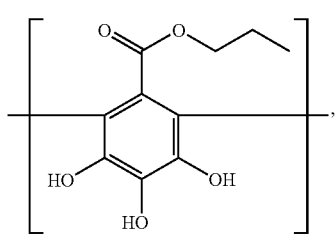
(XI)
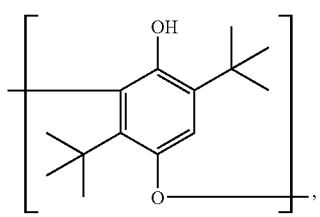
(XII)
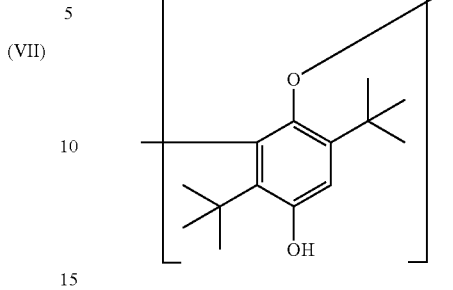
(XIII)
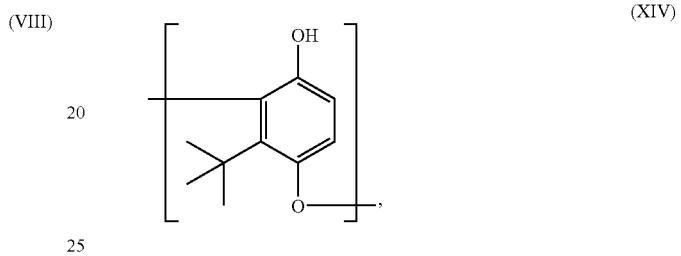
(XIV)
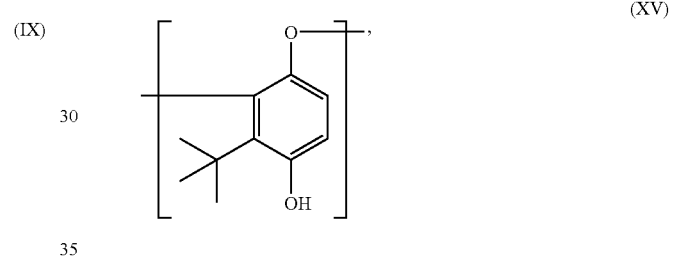
(XV)
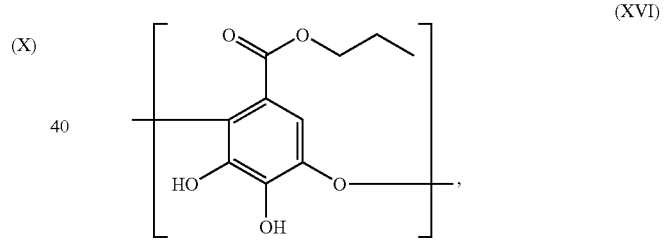
(XVI)
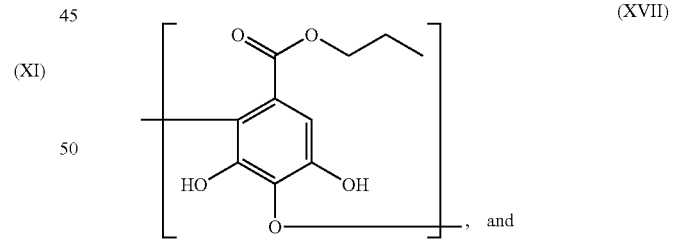
(XVII)
, and
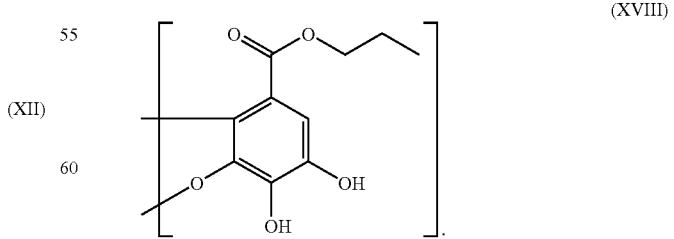
(XVIII)
.
9. The composition of claim 7, wherein the cosmetic product is selected from the group consisting of soaps, creams, lotions and hair products.

10. A composition, comprising an antioxidant polymer that includes repeat units represented by one or both of Structural Formulas (I) and (II):

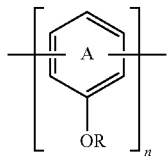
(I)

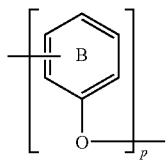
(II)

wherein:
R is —H or a substituted or unsubstituted alkyl, acyl or aryl group;
Ring A is substituted with at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group; and
Ring B is substituted with at least one —H and at least one tert-butyl or substituted or unsubstituted n-alkoxycarbonyl group, and optionally one or more groups selected from the group consisting of —OH, —NH, —SH, a substituted or unsubstituted alkyl or aryl group, and a substituted or unsubstituted alkoxycarbonyl group;
n is an integer equal to or greater than 2; and
p is an integer equal to or greater than 0;
and a product selected from the group consisting of elastomers, lubricants, paints and pigments.

11. The composition of claim 10, wherein the antioxidant polymer includes at least one repeat unit selected from the group consisting of:

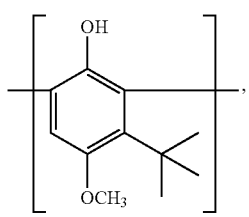
(VII)

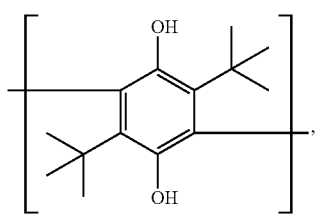
(VIII)

-continued

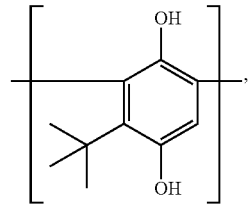
(IX)

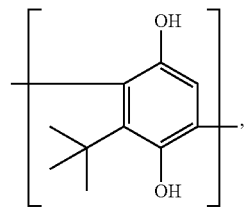
(X)

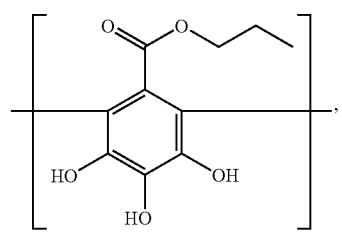
(XI)

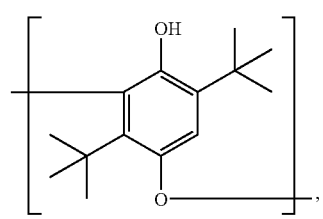
(XII)

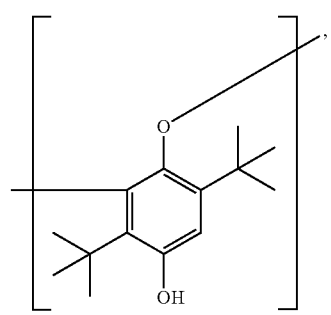
(XIII)

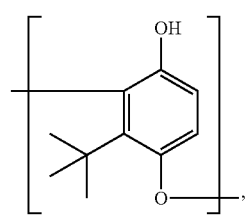
(XIV)

-continued
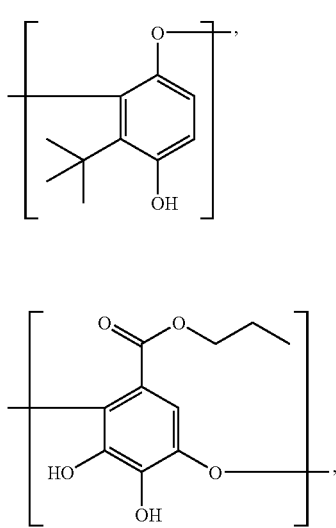
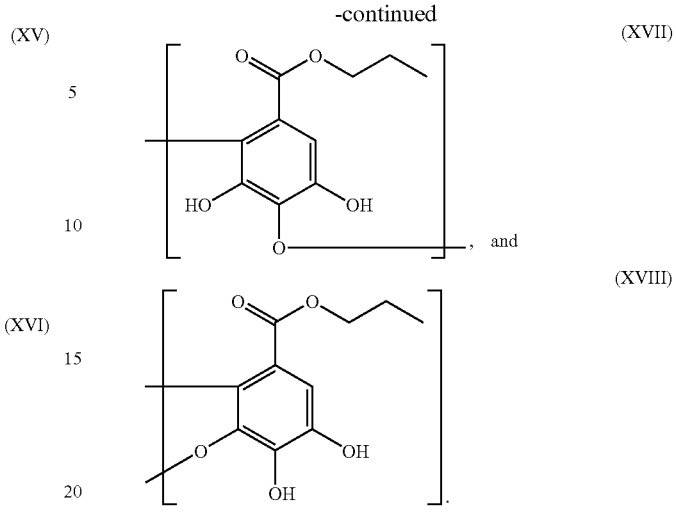
* * * * *

UNITED STATES PATENT AND TRADEMARK OFFICE
CERTIFICATE OF CORRECTION

PATENT NO. : 7,754,267 B2
APPLICATION NO. : 11/711395
DATED : July 13, 2010
INVENTOR(S) : Ashok L. Cholli et al.

Page 1 of 1

It is certified that error appears in the above-identified patent and that said Letters Patent is hereby corrected as shown below:

Title Page under section (75) Inventors:

Please delete "Javant Kumar" and insert --Jayant Kumar--

Signed and Sealed this
Thirty-first Day of May, 2011

David J. Kappos
*Director of the United States Patent and Trademark Office*